(12) United States Patent
Choi et al.

(10) Patent No.: US 8,741,251 B2
(45) Date of Patent: Jun. 3, 2014

(54) GRANULAR MESOPOROUS SILICA AND PREPARATION METHOD THEREOF

(75) Inventors: Heechul Choi, Gwangju (KR); Yo Han Kim, Gwangju (KR); Jiyeol Bae, Gwangju (KR); Ji Hae Park, Gwangju (KR); Jeong Kwon Suh, Gwangju (KR)

(73) Assignee: Gwangju Institute of Science and Technology, Buk-Gu, Gwangju (KR)

( * ) Notice: Subject to any disclaimer, the term of this patent is extended or adjusted under 35 U.S.C. 154(b) by 97 days.

(21) Appl. No.: 13/326,063

(22) Filed: Dec. 14, 2011

(65) Prior Publication Data

US 2013/0095025 A1    Apr. 18, 2013

(30) Foreign Application Priority Data

Oct. 12, 2011    (KR) .................. 10-2011-0104145

(51) Int. Cl.
*C01B 33/12*    (2006.01)
(52) U.S. Cl.
USPC ......................................................... 423/335
(58) Field of Classification Search
USPC .................................. 423/335–340
See application file for complete search history.

(56) References Cited

U.S. PATENT DOCUMENTS

| | | | |
|---|---|---|---|
| 7,695,880 B2 * | 4/2010 | Yoshimura | 430/108.2 |
| 2006/0165574 A1 * | 7/2006 | Sayari | 423/210 |
| 2007/0281232 A1 * | 12/2007 | Yoshimura | 430/108.2 |
| 2010/0280290 A1 * | 11/2010 | Lai et al. | 568/959 |

OTHER PUBLICATIONS

Topka et al., "Preparation of Al-SBA-15 Pellets with low amount of additives: Effect of binder content on texture and mechanical properties. Application to Friedel-Crafts alkylation," Chem. Eng. Journal 160 (2011: Mar. 15, 2011) 433-440.*

Chandrasekar et al., "Preparation of SBA-15 extrudates: Evaluation of textural and mechanical properties," J Porous Mater (2009) 16:175-183.*

Ahmed, Shakeel. "Preparation of Mesoporous Molecular Sieve Based Hydrocracking Catalysts," React. Kinet. Catal. Lett. vol. 90, No. 2. 285-291 (2007).*

Chandrasekar et al., "Extrusion of AlSBA-15 molecular sieves: An industrial point of view," Catalysis Communications 8 (2007) 457-461.*

Martinez et al., "Treatment of Phenolic Effluents by Catalytic Wet Hydrogen Peroxide Oxidation over Fe2O3/SBA-15 Extruded Catalysts in a Fixed-Bed Reactor," Ind. Eng. Chem. Res. 2007, 46,4396-4405.*

* cited by examiner

*Primary Examiner* — Anthony J Zimmer
(74) *Attorney, Agent, or Firm* — Nath, Goldberg & Meyer; Jerald L. Meyer

(57) ABSTRACT

Disclosed are granular mesoporous silica and a preparation method thereof. The preparation method includes preparing powdered silica containing a structure derivative to form mesopores; preparing a molded precursor including the powdered silica and an inorganic binder or an organic binder; preparing a granular molded article having a predetermined shape by extruding or injection-molding the molded precursor; and removing the structure derivative by calcinating the granular molded article. The granular mesoporous silica represents superior pore characteristics and is used as an adsorbent capable of effectively removing pollutants in water treatment and air pollution treatment.

10 Claims, 12 Drawing Sheets

GRANULAR MESOPOROUS SILICA AND PREPARATION METHOD THEREOF

CROSS-REFERENCE TO RELATED APPLICATION

This application claims the benefit under 35 U.S.C. §119 (a) of Korean Patent Application No. 10-2011-0104145, filed on Oct. 12, 2011 in the Korean Intellectual Property Office, the entirety of which is incorporated herein by reference.

BACKGROUND OF THE INVENTION

1. Field of the Invention

The present invention relates generally to mesoporous silica and a preparation method thereof. More particularly, the present invention relates to granular silica having mesopores and a preparation method thereof.

2. Description of the Related Art

Granular activated carbon has the superior adsorption property, persistency and economical efficiency, so the granular activated carbon has been mainly used as an adsorbent in a conventional water treatment system to remove pollutants in water. However, with the global urbanization and industrialization, new pollutants, such as heavy metals and endocrine disrupting chemicals, have appeared, so the pollutants may not be effectively removed by using the conventional water treatment system.

In this regard, mesoporous materials have been spotlighted as a substitute for the adsorbent of the granular activated carbon. In addition, various studies and research have been actively performed with respect to mesoporous silica, mesoporous carbon, and mesoporous metal oxide.

Among them, the mesoporous silica has the regular porous structure, the large specific surface area, and the wide pore size and is stable under the high temperature of about 850° C., so the mesoporous silica is generally known as to be readily reproduced (Zhao et al., 1998). The mesoporous silica is classified as MCM-41, MCM-48 and SBA-15 (Kresge et al., 1992; Zhao et al., 1998) and a study has been performed to adsorb and remove various water pollutants, such as cyanuric acid, p-chlorophenol (Copper et al., 1999) and phenol (Burleigh et al., 2002) by using the mesoporous silica.

However, although the mesoporous silica has the superior porous characteristics and adsorption property, if the powdered adsorbent is used in the water treatment process or the air pollutant treatment process, the treatment efficiency may be lowered due to the long-time exposure of the powdered adsorbent. In addition, since the powdered adsorbent has a small grain size, the powdered adsorbent may be lost during the pollutant treatment process, so the recovery of the powdered adsorbent is difficult.

For this reason, various studies and research have been pursued to granulize the powdered adsorbent. For instance, according to the study of Govindasamy et al., 2009, bentonite, methylcellulose, and tetraethyl orthosilicate (TEOS) are injected into the mesoporous silica to granulize the mesoporous silica. In addition, according to another study of Pavel et al., 2011, the granulation is achieved by using colloidal silica, and the porous characteristic and the mechanical strength of the granular silica are analyzed and measured.

However, according to the conventional method for preparing spherical molded articles or the conventional granulation method, a greater amount of organic binder or inorganic binder must be used to hold the molded article, so the purity of the molded article may be reduced. Especially, due the binder used to granulize the mesoporous materials, pores of the mesoporous materials may be occluded. In this case, the porous characteristic of the adsorbent may be degraded, so the adsorbent may not sufficiently perform the function thereof.

Therefore, it is necessary to develop the preparation method for a granular silica molded article, which can hold the superior mesoporous characteristics and can be efficiently used for the air pollutant treatment process and the water treatment process.

REFERENCES (Non-patent document 1) Zhao et al., Triblock copolymer syntheses of mesoporous silica with periodic 50 to 300 angstrom pores, Science, 1998, vol 279, pages 548-552.

(Non-patent document 2) Kresge et al., Ordered mesoporous molecular sieves synthesized by a liquid-crystal template mechanism, Nature, 1992, vol 359, pages 710-712.

(Non-patent document 3) Copper et al., Mesoporous materials for water treatment processes, Water Research, 1999, vol 33, pages 3689-3694.

(Non-patent document 4) Burleigh et al., Porous polysilsesquioxanes for the adsorption of phenols, Environmental Science and Technology, 2002, vol 36, pages 2515-2518.

(Non-patent document 5) Govindasamy et al., Preparation of SBA-15 extrudates: Evaluation of textural and mechanical properties, Journal of porous materials, 2009, vol 16, pages 175-183.

(Non-patent document 6) Pavel et al., Preparation of ALSBA-15 pellets with low amount of additives: Effect of binder content on texture and mechanical properties. Application to Friedel.Crafts alkylation, Chemical Engineering Journal, 2010, vol 168, pages 433-440.

SUMMARY OF THE INVENTION

Accordingly, the present invention has been made keeping in mind the above problems occurring in the prior art, and an object of the present invention is to provide granular mesoporous silica, which can hold the superior mesoporous characteristics and can be efficiently used in various fields, such as the air pollutant treatment process and the water treatment process, and a preparation method thereof.

To accomplish the above object, according to one aspect of the present invention, there is provided a preparation method for granular mesoporous silica. The preparation method includes the steps of preparing powdered silica containing a structure derivative to form mesopores; preparing a molded precursor including the powdered silica and an inorganic binder or an organic binder; preparing a granular molded article having a predetermined shape by extruding or injection-molding the molded precursor; and removing the structure derivative by calcinating the granular molded article.

The step of preparing the powdered silica includes a step of reacting the structure derivative to form the mesopores with the silica precursor in an acidic aqueous solution.

The structure derivative may include an alkylene oxide-based surfactant, and the powdered silica may include at least one selected from SBA-based silica and M41S-based silica.

The silica precursor may include at least one selected from the group consisting of alkoxysilane, colloidal silica, fumed silica, and sodium silicate.

The inorganic binder includes at least one selected from sepiolite and bentonite.

The organic binder includes polyvinylalcohol-based polymer.

In addition, if the molded precursor includes the inorganic binder, the molded precursor may further include an organic additive, which is removed together with the structure derivative when the molded article is calcinated.

The organic additive includes one selected from the group consisting of PVA, CMC, MCe and a mixture thereof.

The calcination is performed at the temperature range of about 400° C. to about 800° C. while injecting air.

To accomplish the above object, according to another aspect of the present invention, there is provided granular mesoporous silica prepared according to the above method.

As described above, the granular mesoporous silica according to the present invention may hold the pore characteristics similar to the pore characteristics of the powdered silica used as a raw material for the granular mesoporous silica and can be used as an adsorbent capable of effectively removing pollutants in the water treatment process and air pollutant treatment process. In addition, the granular mesoporous silica can be stably recovered as compared with the powdered adsorbent and the secondary pollution caused by the loss of the adsorbent can be prevented, so that the convenience of use and economic efficiency can be improved. Further, different from the powdered mesoporous silica, when the granular mesoporous silica is employed in the water treatment process, the pressure drop occurring in the fixed bed reactor can be attenuated. In addition, since the powdered mesoporous silica can be used in various types of the pollutant treatment systems, such as a pallet type, a stack type or a plate type pollutant treatment system, the application thereof can be improved.

The effects of the present invention may not be limited to the above effects, and other effects of the present invention may be comprehended to those skilled in the art from the following description.

BRIEF DESCRIPTION OF THE DRAWINGS

FIGS. 4a to 4f are photographic views showing granular mesoporous silica prepared according to one embodiment of the present invention; and FIGS. 5a to 4e are photographic views showing granular mesoporous silica prepared according to another embodiments of the present invention.

DETAILED DESCRIPTION OF THE INVENTION

Hereinafter, exemplary embodiments of the present invention will be described with reference to accompanying drawings. The embodiments will make the disclosure of the present invention complete, and allow those skilled in the art to completely comprehend the scope of the present invention. The present invention is not limited to the following embodiments, but can be embodied in various forms and includes various equivalents and substitutes within the technical scope of the present invention. If it is determined that description about well known functions or configurations may make the subject matter of the present invention unclear, the details thereof will be omitted.

A preparation method for granular mesoporous silica according to one embodiment of the present invention includes the steps of preparing powdered silica containing a structure derivative to form mesopores; preparing a molded precursor including the powdered silica and an inorganic binder; preparing a granular molded article having a predetermined shape by extruding or injection-molding the molded precursor; and removing the structure derivative by calcinating the granular molded article.

Figure 1:
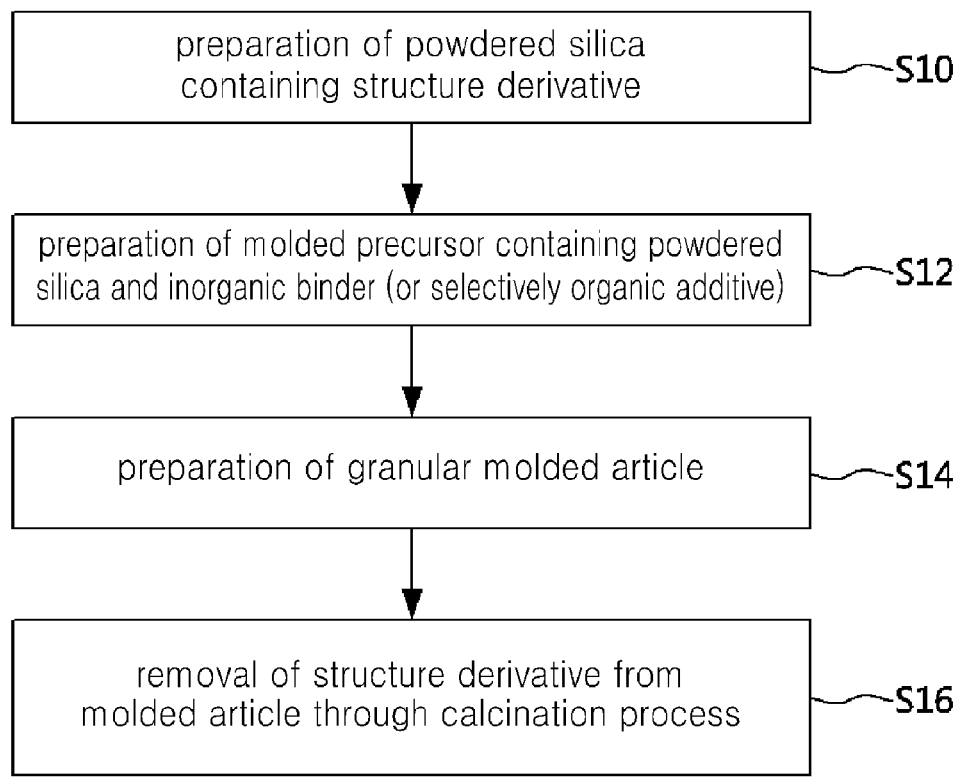
FIG. 1 is a flowchart showing a preparation method for granular mesoporous silica according to one embodiment of the present invention.

FIG. 1 is a flowchart showing the preparation method for granular mesoporous silica according to the embodiment of the present invention.

Referring to FIG. 1, powdered silica containing a structure derivative to form mesopores is prepared (S10).

In the following description, the term "mesopore" refers to a pore having a diameter in the range of about 2 nm to about 50 nm, preferably, in the range of about 3 nm to about 10 nm, more preferably, in the range of about 4 nm to about 6 nm.

In addition, the term "structure derivative" refers to a material that serves as a template for a material to be synthesized to induce porosity to silica. The structure derivative may refer to a structure directing agent or a pore generator generally used in the art. In particular, according to the present embodiment, the structure derivative is contained in silica synthesized through the hydration or condensation reaction of the silica precursor and removed through the subsequent calcination process to impart the porosity to the silica.

According to the present embodiment, powdered silica used as a raw material for the granular mesoporous silica contains the structure derivative to form the mesopores. That is, the powdered silica refers to silica powder containing the structure derivative before the calcination process.

The step of preparing the powdered silica (S10) includes a step of reacting the structure derivative to form the mesopores with the silica precursor in an acidic aqueous solution.

The structure derivative may include organic surfactant, for instance, alkylene oxide-based surfactant. The alkylene oxide-based surfactant may include a block copolymer selected from the group consisting of C16EO2, C12EO4, C16EO10, C16EO20, C18EO10, C16EO20, C18H35EO10, C12EO23, Tween 20, Tween 40, Tween 60, Tween 80, Span 40, Triton X-100, Triton X-114, Tergitol TMN-6, Tergitol TMN-10, Pluronic L121, Pluronic L64, Pluronic P65, Pluronic P85, Pluronic P103, Pluronic P123, Pluronic P68, Pluronic F127, Pluronic F88, Pluronic 25R4, Tetronic 908, Tetronic 901, and Tetronic 90R4.

The powdered silica may include at least one selected from the group consisting of SBA-based silica (for instance, SBA-1, SBA-2, SBA-3, SBA-6, SBA-11, SBA-12, SBA-15 and SBA-16) and M41 S-based silica (for instance, MCM-1, MCM-2, MCM-3, MCM-4, MCM-5, MCM-9, MCM-10, MCM-14, MCM-22, MCM-41, MCM-48, MCM-49, MCM-50 and MCM-56). However, the present invention is not limited to the above.

The silica precursor may include alkoxysilane, such as tetramethyl orthosilicate (TMOS), tetraethyl orthosilicate (TEOS), tetrapropyl orthosilicate or tetrabutyl orthosilicate, colloidal silica, fumed silica, or sodium silicate.

For example, the powdered silica may include SBA-15 containing the structure derivative. The SBA-15 employs an organic surfactant (Pluronic P123) as the structure derivative and can be synthesized under the acidic condition by using the TEOS as the silica precursor. The SBA-15 can be simply and easily synthesized and reproduced and has a regular pore size. In addition, by-products of the SBA-15 generated during the synthesizing process have no toxicity, so the SBA-15 is advantageous in terms of environmental-friendly concept.

Then, a molded precursor including the powdered silica and an inorganic binder is prepared (S12).

The inorganic binder serves as a binder when the powdered silica is granulized and includes a clay inorganic substance including Al, Mg and Si.

Preferably, the inorganic binder may include one selected from sepiolite and bentonite. The inorganic binder itself has pores and is not removed through the subsequent calcination process, so the adsorption effect may be further expected by the inorganic binder in addition to the adsorption effect of the mesoporous silica.

The molded precursor may be a fluidized material, which can be extruded or injection-molded. For instance, the molded precursor may include a mixture of the powdered silica and the inorganic binder dispersed in a solvent, such as distilled water. Preferably, the amount of the inorganic binder contained in the molded precursor is 10 weight parts to 75 weight parts based on 100 weight parts of the powdered silica. If the amount of the inorganic binder is less than 10 weight parts, the inorganic binder may not serve as the binder, so the desired granular shape may not be obtained. In addition, if the amount of the inorganic binder exceeds 75 weight parts, the pore characteristics of the granular mesoporous silica may be significantly lowered.

In addition, the molded precursor may selectively include an organic additive. The organic additive may include one selected from the group consisting of PVA (polyvinyl alcohol), CMC (carboxymethyl cellulose (sodium salt)), MCe (microcrystalline cellulose), and the mixture thereof.

The organic additive may serve as an additional binder when the powdered silica is granulized. In addition, different from the inorganic binder, the organic additive may be removed through the calcination process after the powdered silica has been granulized. Since the removed part may serve as another pore, the pore characteristics can be improved. However, if the organic additive is excessively added, the specific surface area of the granular mesoporous silica may be reduced. Thus, the amount of the organic additive is equal to or less than 30 weight parts, preferably, equal to or less than 20 weight parts based on 100 weight parts of the powdered silica.

Then, a granular molded article having a predetermined shape is prepared by extruding or injection-molding the molded precursor (S14).

That is, according to the present invention, the granulation process includes a step of extruding or injection-molding the molded precursor, which includes the powdered silica containing the structure derivative and the inorganic binder and selectively includes the organic additive, into the predetermined shape. Thus, the final product, that is, the granular mesoporous silica can be prepared in various types, such as a pallet type, a stack type or a plate type. As a result, the granular mesoporous silica can be applied to various pollutant treatment systems, so the application of the granular mesoporous silica may be improved.

Finally, the structure derivative contained in the granular molded article is removed by calcinating the granular molded article (S16). Meanwhile, if the granular molded article contains the organic additive, the organic additive is also removed through the calcination process.

The calcination process refers to the process for cooling the molded article after heat-treating the molded article under the high temperature condition. In detail, the heat treatment process includes a step of heating the molded article in the temperature of about 400° C. to about 800° C. while injecting air. If the temperature is less than 400° C., the calcination may not be sufficient. In addition, if the temperature exceeds 800° C., cracks may be generated in the granular mesoporous silica, so that the granular mesoporous silica may be degraded.

Through the calcination process, the inorganic material (structure derivative and organic additive) except for the organic material (silica and inorganic binder) is subject to combustion, so the pores are formed and realigned. In addition, the molded article may be sintered, so that the silica securely adheres to the inorganic binder, thereby improving the mechanical strength of the granular mesoporous silica.

As described above, according to the present embodiment, the powdered silica containing the structure derivative is granulized and the organic substance is removed through one calcination process, so that the synthesizing time for the granular mesoporous silica can be shortened and the preparation cost can be reduced. In addition, the powdered silica used as the raw material contains the structure derivative, that is, the mesopores have not yet been formed in the powdered silica, so the mesopores that have been previously formed may not be occluded when various binders are added or when the molding process is performed to granulize the powdered silica. In addition, the inorganic binder itself has the pores and the pores are additionally formed through the combustion of the organic additive, so that the pore characteristics of the mesoporous silica may not be significantly changed before and after the granulation.

A preparation method for granular mesoporous silica according to another embodiment of the present invention includes the steps of preparing powdered silica containing a structure derivative to form mesopores; preparing a molded precursor including the powdered silica and an organic binder; preparing a granular molded article having a predetermined shape by extruding or injection-molding the molded precursor; and removing the structure derivative and the organic binder by calcinating the granular molded article.

Figure 2:
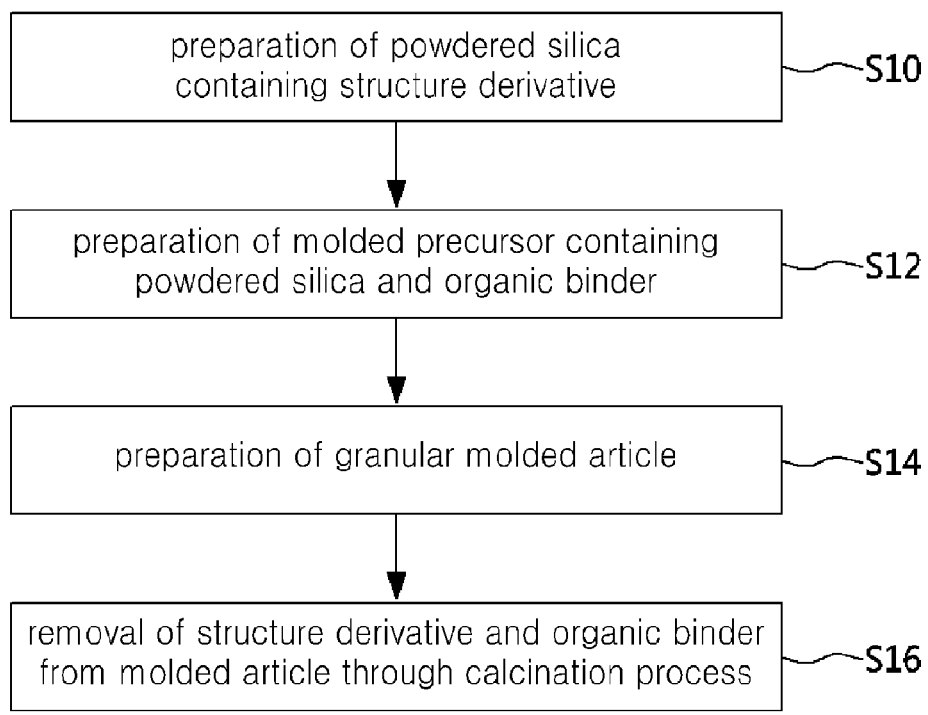
FIG. 2 is a flowchart showing a preparation method for granular mesoporous silica according to another embodiment of the present invention.
Figure 3A:
FIG. 3 is a photographic view showing an extruder used in a preparation method for granular mesoporous silica according to the embodiment of the present invention.
Figure 3B:
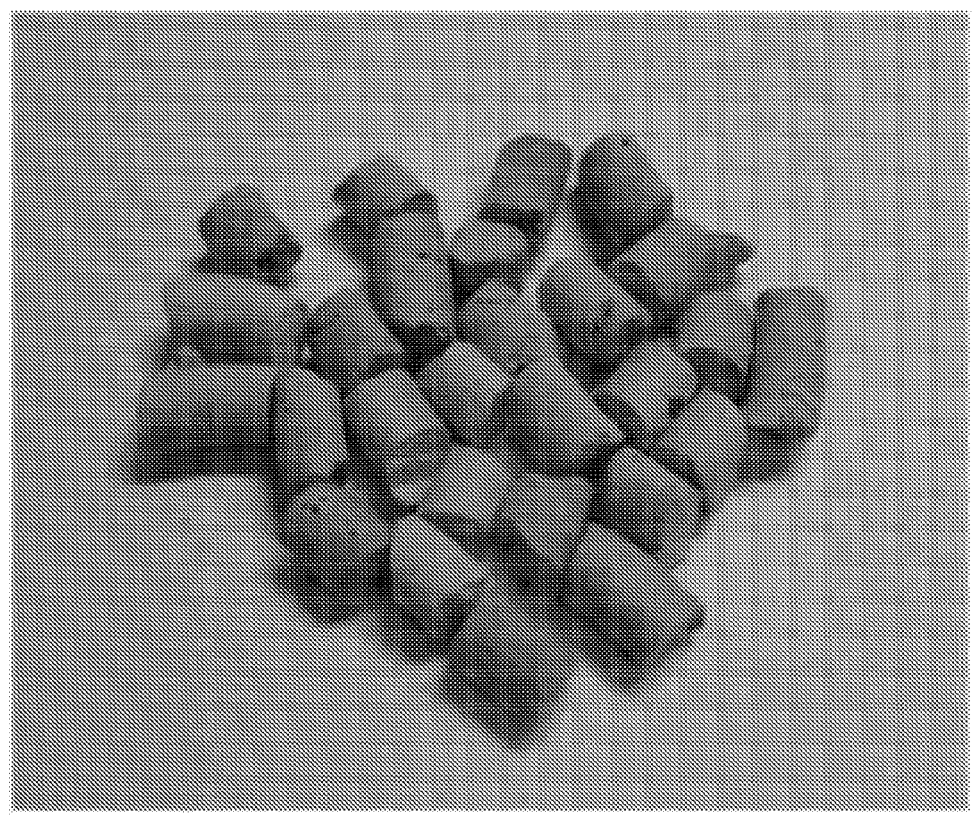
Figure 3C:
Figure 3D:
Figure 3E:
Figure 3F:

FIG. 2 is a flowchart showing a preparation method for granular mesoporous silica according to another embodiment of the present invention.

According to the preparation method for granular mesoporous silica according to another embodiment of the present invention, a molded precursor including powdered silica and an organic binder is prepared (S12).

The organic binder serves as a binder when the powdered silica is granulized and preferably includes a polyvinylalcohol (PVA)-based polymer.

The organic binder is removed together with the structure derivative when the calcination process is performed after the granulation process. Since the removed part may serve as another pore, the pore characteristics can be improved.

The amount of the organic binder is 10 weight parts to 30 weight parts based on 100 weight parts of the powdered silica containing the structure derivative. If the amount of the organic binder in the molded precursor is less than 10 weight parts, the inorganic binder may not serve as the binder, so the desired granular shape may not be obtained. In addition, if the amount of the organic binder exceeds 30 weight parts, the pore characteristics of the granular mesoporous silica may be significantly lowered.

The molded precursor may be a fluidized material, which can be extruded or injection-molded. For instance, the molded precursor may include a mixture of the powdered silica and the organic binder dispersed in a solvent, such as distilled water. The amount of the distilled water is 10 Ml to 50 Ml based on 50 g of the mixture of the powdered silica and the organic binder. If the amount of the distilled water is less than 10 Ml, the molded precursor may not be readily extruded. In addition, if the amount of the distilled water exceeds 50 Ml, the content of the distilled water is too high to maintain the granular configuration.

Therefore, the final product, that is, the granular mesoporous silica may have the pore characteristics similar to the pore characteristics of the powdered mesoporous silica, so that the granular mesoporous silica may have the adsorption property similar to the adsorption property of the powdered adsorbent. Thus, the granular mesoporous silica can be applied to various fields, such as water treatment, air pollutant treatment, and gas storage.

According to another embodiment of the present invention, there is provided the granular mesoporous silica prepared through the above method.

In addition, according to still another embodiment of the present invention, there is provided the adsorbent including the granular mesoporous silica prepared through the above method.

The granular silica according to the present invention may be classified as Type 4 defined by IUPAC (International Union of Pure and Applied Chemistry), signifying that the granular silica has the mesopores.

As described above, the granular mesoporous silica according to the present invention may have the pore characteristics similar to the pore characteristics of the powdered silica, which is the raw material, so the granular mesoporous silica can be effectively used as the adsorbent in the water treatment and air pollutant treatment. In addition, the granular mesoporous silica can be stably recovered as compared with the conventional powdered adsorbent and can prevent the secondary pollution caused by the loss of the adsorbent, so the convenience of use and the economic efficiency can be improved. Especially, if the granular mesoporous silica is employed in the water treatment process, the pressure drop occurring in the fixed bed reactor can be attenuated.

Hereinafter, the exemplary experimental examples will be described such that those skilled in the art can comprehend the present invention. However, these exemplary experimental examples are illustrative purpose only and the present invention is not limited thereto.

Preparation Example 1

A mixed solution of non-ionic surfactant (pluronic P 123) serving as a structure derivative and TEOS (tetraethyl orthosilicate) was prepared in an acidic aqueous solution (HCl+ distilled water, pH 1~3).

The mixed solution was stirred and reacted for 20 hours at the temperature of 35° C. and then washed by using distilled water after the mixed solution has been matured for 20 hours at the temperature of 100° C., thereby synthesizing powdered silica containing the structure derivative.

The powdered silica used in the synthesizing process for the SBA-15 mesoporous silica was not subject to the calcination process, that is, the structure derivative was not removed from the powdered silica, and sepiolite (specific surface area 270.91 m$^2$/g) was used as the inorganic binder.

Figure 4A:
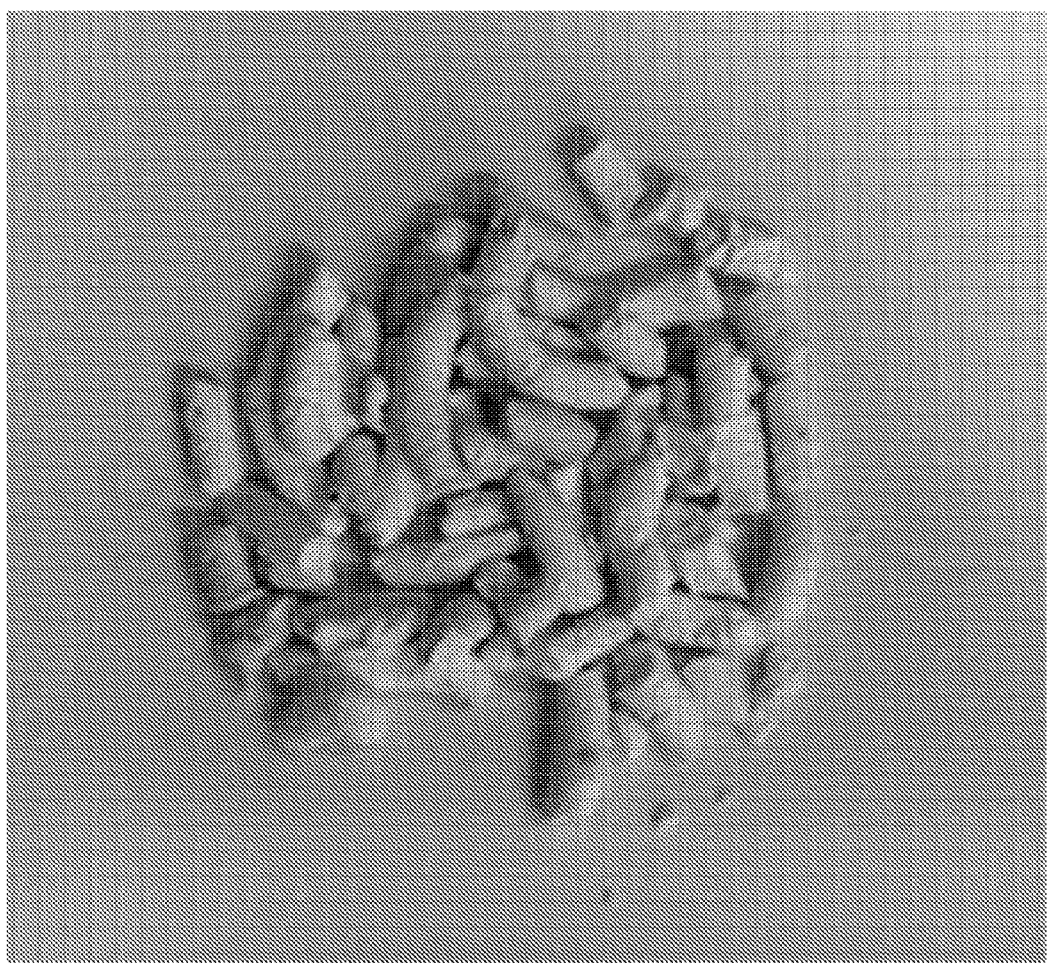

Then, after sufficiently stirring 10 weight parts to 17 weight parts of the sepiolite based on 100 weight parts of the powdered silica, which was not subject to the calcination process, the mixture was extruded by using an extruder (see, FIG. 3) formed with an extruding hole having a size of 3 mm. The extruded article was dried at the temperature of 90° C. to 100° C. and calcinated for 4 hours at the temperature of 500° C. while injecting air, thereby preparing the granular mesoporous silica (see, FIG. 4a: granular mesoporous silica prepared by using the sepiolite (17 weight parts)).

Table 1 shows the comparison result of physical properties between the granular mesoporous silica prepared through preparation example 1 and the powdered mesoporous silica (powdered silica where the structure derivative was removed through the calcination process).

TABLE 1

| Injection amount of sepiolite (weight part)[note1] | BET specific surface area (m$^2$/g) | Pore volume (cm$^3$/g) | Mean pore size (nm) |
|---|---|---|---|
| 0 [note2] | 829.63 | 1.01 | 4.9 |
| 10 | 699.78 | 0.93 | 5.3 |
| 17 | 669.37 | 0.85 | 5.2 |

[note 1] amount of sepiolite based on 100 weight parts of powdered silica containing structure derivative.
[note 2] BET specific surface area, pore volume, and mean pore size without sepiolite were measured with respect to powdered silica where structure derivative was removed, that is, mesopores were formed.

Referring to Table 1, when comparing with the powdered mesoporous silica, the specific surface area and the pore volume of the granular mesoporous silica were slightly reduced as the injection amount of sepiolite was increased, but the pore characteristics of the granular mesoporous silica were similar to the pore characteristics of the powdered mesoporous silica. In addition, it was confirmed from the mean pore size of the granular silica that the molded article had the mesopores.

Preparation Example 2

The powdered silica used in the synthesizing process for the SBA-15 mesoporous silica was not subject to the calcination process, that is, the structure derivative was not removed from the powdered silica, sepiolite was used as the inorganic binder, and PVA (polyvinyl alcohol), CMC (carboxymethyl cellulose), and MCe (microcrystalline cellulose) were used as the organic additive.

Figure 4B:
Figure 4C:
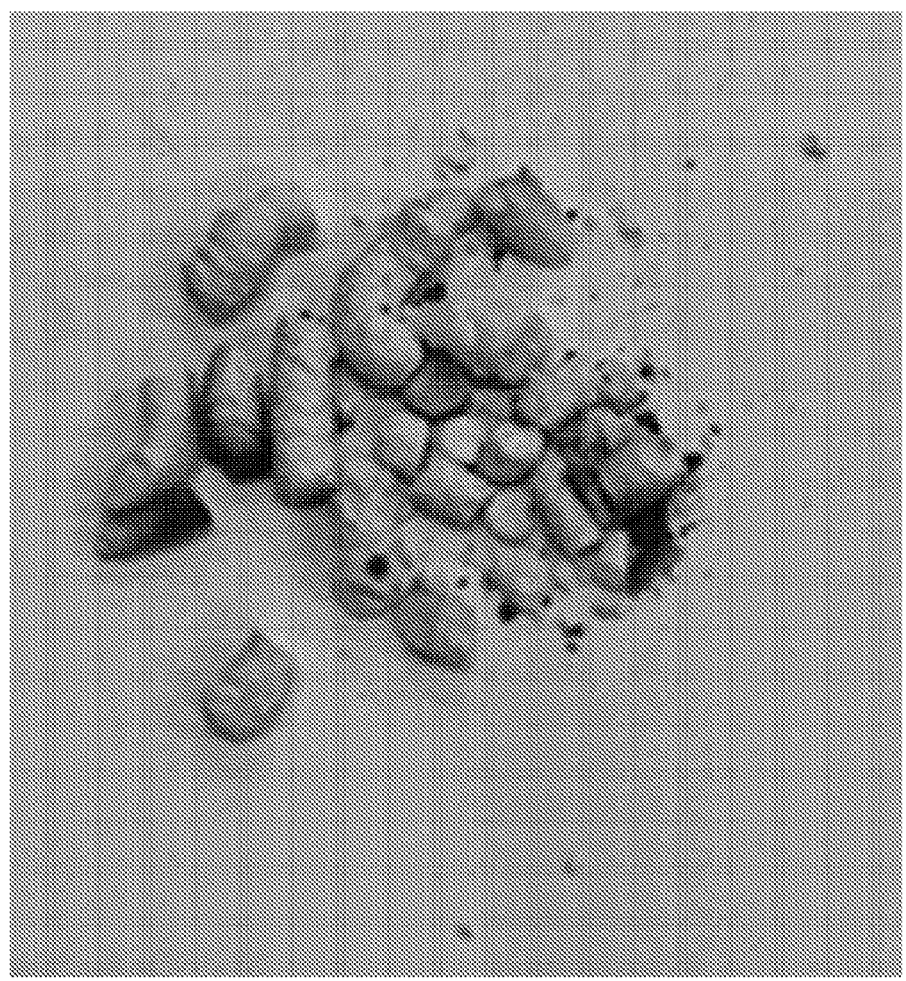

The injection amount of sepiolite was fixed to 17 weight parts based on 100 weight parts of the powdered silica, which was not subject to the calcination process, and the organic additive including PVA (10 weight parts), CMC (5 weight parts), and MCe (10 weight parts) was mixed. After sufficiently stirring the mixture, the mixture was extruded by using an extruder (see, FIG. 3) formed with an extruding hole having a size of 3 mm. The extruded article was dried at the temperature of 90° C. to 100° C. and calcinated for 4 hours at the temperature of 500° C. while injecting air, thereby preparing the granular mesoporous silica (see, FIG. 4b: sepiolite+PVA/MCe and FIG. 4c: sepiolite+CMC/MCe).

Table 2 shows the comparison result of physical properties between the granular mesoporous silica prepared through preparation example 2 and the granular mesoporous silica prepared without using the organic additive.

TABLE 2

| Injection amount of sepiolite (weight part)[note 1] | Injection amount of sepiolite (weight part)[note 1] | BET specific surface area (m$^2$/g) | Pore volume (cm$^3$/g) | Mean pore size (nm) |
|---|---|---|---|---|
| 17 | — | 669.37 | 0.85 | 5.2 |
|  | PVA(10) + MCe(10) | 647.74 | 0.85 | 5.2 |
|  | CMC(5) + MCe(10) | 509.18 | 0.70 | 5.5 |

TABLE 2-continued

| Injection amount of sepiolite (weight part)[note 1] | Injection amount of sepiolite (weight part)[note 1] | BET specific surface area (m²/g) | Pore volume (cm³/g) | Mean pore size (nm) |
|---|---|---|---|---|

[note 1] amount of sepiolite based on 100 weight parts of powdered silica containing structure derivative.
note 2) amount of organic additive based on 100 weight parts of powdered silica containing structure derivative.

Referring to Table 2, when comparing with the granular mesoporous silica prepared by using only the inorganic binder, the specific surface area of the granular mesoporous silica prepared by using both the inorganic binder and the organic additive was slightly reduced. In addition, the pore volume was the same or slightly reduced, and the mean pore size was the same or slightly increased.

Meanwhile, the specific surface area and the pore volume of the granular mesoporous silica prepared by injecting the PVA and MCe were increased when comparing with the granular mesoporous silica prepared by injecting the CMC and MCe.

In addition, when comparing with the powdered mesoporous silica (see, preparation example 1), the specific surface area and the pore volume of the granular mesoporous silica prepared by injecting the organic additive were slightly reduced, but the pore characteristics was similar and the mean pore size was slightly increased within the range of the mesopores.

Preparation Example 3

The powdered silica used in the synthesizing process for the SBA-15 mesoporous silica was not subject to the calcination process, that is, the structure derivative was not removed from the powdered silica, and bentonite was used as the inorganic binder.

Figure 4D:

Then, after sufficiently stirring 16 weight parts to 75 weight parts of the bentonite based on 100 weight parts of the powdered silica, which was not subject to the calcination process, the mixture was extruded by using an extruder (see, FIG. 3) formed with an extruding hole having a size of 3 mm. The extruded article was dried at the temperature of 90° C. to 100° C. and calcinated for 4 hours at the temperature of 500° C. while injecting air, thereby preparing the granular mesoporous silica (see, FIG. 4d: granular mesoporous silica prepared by using the bentonite (16 weight parts)).

Table 3 shows the physical properties of the granular mesoporous silica prepared through preparation example 3.

TABLE 3

| Injection amount of sepiolite (weight part)[note 1] | BET specific surface area (m²/g) | Pore volume (cm³/g) | Mean pore size (nm) |
|---|---|---|---|
| 16 | 357.14 | 0.5 | 5.3 |
| 27 | 332.26 | 0.4 | 5.3 |
| 41 | 261.00 | 0.4 | 5.6 |
| 75 | 198.96 | 0.3 | 5.8 |

[note 1] amount of bentonite based on 100 weight parts of powdered silica containing structure derivative.

Referring to Table 3, since the specific surface area of the bentonite is relatively low (65.31 m²/g), the specific surface area of the granular mesoporous silica was reduced as the injection amount of the bentonite was increased. When comparing with the powdered mesoporous silica, the specific surface area of the granular mesoporous silica was reduced by about 76%. In addition, the pore volume was also reduced as the injection amount of the bentonite was increased. However, the mean pore size was maintained within the range of the mesopores.

Preparation Example 4

The powdered silica used in the synthesizing process for the SBA-15 mesoporous silica was not subject to the calcination process, that is, the structure derivative was not removed from the powdered silica, bentonite was used as the inorganic binder, and CMC and MCe were used as the organic additive.

The injection amount of bentonite was fixed to 27 weight parts based on 100 weight parts of the powdered silica, which was not subject to the calcination process, and the organic additive including 7 weight parts of the CMC and 5 weight parts to 20 weight parts of the MCe was mixed. After sufficiently stirring the mixture, the mixture was extruded by using an extruder (see, FIG. 3) formed with an extruding hole having a size of 3 mm. The extruded article was dried at the temperature of 90° C. to 100° C. and calcinated for 4 hours at the temperature of 500° C. while injecting air, thereby preparing the granular mesoporous silica (see, FIG. 4e: bentonite+CMC, FIG. 4f: bentonite+MCe).

Table 4 shows the comparison result of physical properties between the granular mesoporous silica prepared through preparation example 4 and the granular mesoporous silica prepared without using the organic additive.

TABLE 4

| Injection amount of sepiolite (weight part)[note 1] | Organic additive | Injection amount of organic additive (weight part)[note 2] | BET specific surface area (m²/g) | Pore volume (cm³/g) | Mean pore size (nm) |
|---|---|---|---|---|---|
| 27 | — | 0 | 332.26 | 0.44 | 5.3 |
|  | CMC | 7 | 286.24 | 0.40 | 5.6 |
|  | MCe | 5 | 329.63 | 0.44 | 5.4 |
|  |  | 10 | 365.52 | 0.47 | 5.1 |
|  |  | 20 | 304.63 | 0.40 | 5.3 |

[note 1] amount of bentonite based on 100 weight parts of powdered silica containing structure derivative.
[note 2] amount of organic additive based on 100 weight parts of powdered silica containing structure derivative.

Referring to Table 4, when 7 weight parts of the CMC and 5 weight parts to 20 weight parts of the MCe were injected as the organic additive, the specific surface area of the granular mesoporous silica was reduced due to the low specific surface area of the bentonite. Especially, when 7 weight parts of the CMC was injected, the specific surface area of the granular mesoporous silica was significantly reduced because the interval between particles of the mesoporous silica was narrowed by the CMC. In addition, the pore volume was changed within 10% before and after the use of the organic additive, signifying that the pore volume was maintained after the granular mesoporous silica has been prepared by using the organic additive.

Preparation Example 5

A mixed solution of non-ionic surfactant (pluronic P 123) serving as a structure derivative and TEOS (tetraethyl orthosilicate) was prepared in an acidic aqueous solution (HCl+ distilled water, pH 1~3).

The mixed solution was stirred and reacted for 20 hours at the temperature of 35° C. and then washed by using distilled water after the mixed solution has been matured for 20 hours at the temperature of 100° C., thereby synthesizing powdered silica containing the structure derivative.

Then, 10 weight parts of PVA were blended based on 100 weight parts of the powdered silica containing the structure derivative, and 3 Ml of distilled water was added based on 50 g of the blend and then mixed by using a stirrer. The mixture was extruded by using the extruder (see, FIG. 3) formed with an extruding hole having a size of 3 mm. The extruded article was dried at the temperature of 90° C. to 100° C. and calcinated for 4 hours at the temperature of 500° C. while injecting air, thereby preparing the granular mesoporous silica where the structure derivative (pluronic P123) and the organic binder (PVA) had been removed (see, FIG. 5a).

Preparation Example 6

The granular mesoporous silica (see, FIG. 5b) was prepared through the procedure the same as that of preparation example 1 except that 20 weight parts of PVA were blended based on 100 weight parts of the powdered silica containing the structure derivative.

Preparation Example 7

The granular mesoporous silica (see, FIG. 5c) was prepared through the procedure the same as that of preparation example 1 except that 30 weight parts of PVA were blended based on 100 weight parts of the powdered silica containing the structure derivative.

Table 5 shows the comparison result of physical properties between the granular mesoporous silica prepared through preparation examples 5 to 7 and the powdered mesoporous silica (powdered silica where the structure derivative was removed through the calcination process).

TABLE 5

| Organic binder | Injection amount[note1] (weight part) | BET specific surface area ($m^2/g$) | Pore volume ($cm^3/g$) | Mean pore size (nm) | Crushing strength ($kgf/cm^2$) |
|---|---|---|---|---|---|
| PVA | 10 | 730.80 | 0.86 | 4.7 | 0.3 |
|  | 20 | 737.34 | 0.86 | 4.7 | 0.5 |
|  | 30 | 625.82 | 0.72 | 4.6 | 0.5 |
| MS powder[note2] | — | 829.63 | 1.01 | 4.9 | — |

[note 1] amount of PVA based on 100 weight parts of powdered silica containing structure derivative.
[note 2] powdered mesoporous silica where structure derivative was removed through calcination, that is, mesopores were formed.

Referring to Table 5, when the granular silica was prepared by using PVA as the organic binder, the granular silica represented the pore characteristics similar to the pore characteristics of the powdered mesoporous silica. In particular, when 20 weight parts of the PVA were blended, the highest specific surface area was represented. However, if 10 weight parts of the PVA were blended, the crushing strength was significantly lowered, so that the granular configuration was not kept. In addition, if 30 weight parts of the PVA were blended, the pore characteristics were lowered due to the high content of the binder.

Comparative Example 1

The granular mesoporous silica was prepared through the procedure the same as that of preparation example 7 except that CMC (carboxymethyl cellulose) and MCE (microcrystalline cellulose) were used instead of PVA as binders (FIG. 5d: CMC was used, FIG. 5e: MCe was used).

Table 6 shows the comparison result of physical properties between the granular mesoporous silica prepared through comparative example 1 and the granular mesoporous silica prepared through preparation example 7.

TABLE 6

| Organic binder | Injection amount[note1] (weight part) | BET specific surface area ($m^2/g$) | Pore volume ($cm^3/g$) | Mean pore size (nm) | Crushing strength ($kgf/cm^2$) |
|---|---|---|---|---|---|
| PVA | 30 | 625.82 | 0.72 | 4.6 | 0.5 |
| CMC | 30 | 38.39 | 0.11 | 11.5 | 2.1 |
| MCe | 30 | 848.25 | 0.97 | 4.6 | — |

[note 1] amount of organic binder on 100 weight parts of powdered silica containing structure derivative.

Referring to Table 6, when the CMC was used as the organic binder, the high crushing strength was represented, but the specific surface area and the pore volume were significantly reduced, so the pore characteristics were degraded as compared with the pore characteristics of the powdered mesoporous silica. In addition, when the MCe was used as the organic binder, high pore characteristics were represented, but the crushing strength was very low to the extent that the measurement of the crushing strength was impossible. Thus, it was confirmed that the granulation applicable for the water treatment was not achieved.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A preparation method for granular mesoporous silica, the preparation method comprising:
    preparing powdered silica containing a structure derivative, wherein the structure derivative forms mesopores;
    preparing a molded precursor, the molded precursor comprising the powdered silica and an inorganic binder, or an organic binder, or both the inorganic binding and the organic binder;
    preparing a granular molded article having a predetermined shape by extruding or injection-molding the molded precursor; and
    removing the structure derivative by calcinating the granular molded article.

2. The preparation method of claim 1, wherein the structure derivative includes an alkylene oxide-based surfactant.

3. The preparation method of claim 1, wherein the powdered silica includes at least one selected from SBA-based silica and M41S-based silica.

4. The preparation method of claim 1, wherein the inorganic binder includes at least one selected from sepiolite and bentonite.

5. The preparation method of claim 1, wherein the molded precursor comprises at least in part an inorganic binder, and further comprises an organic additive, and
    wherein the organic additive is removed when the molded article is calcinated.

6. The preparation method of claim 5, wherein the organic additive includes one selected from the group consisting of PVA, CMC, MCe and a mixture thereof.

7. The preparation method of claim 1, wherein the organic binder includes polyvinylalcohol-based polymer.

8. The preparation method of claim 1, wherein the step of preparing the powdered silica further comprises reacting the structure derivative for forming the mesopores with the molded precursor in an acidic aqueous solution.

9. The preparation method of claim 8, wherein the silica precursor includes at least one selected from the group consisting of alkoxysilane, colloidal silica, fumed silica, and sodium silicate.

10. The preparation method of claim 1, wherein the calcination is performed at a temperature range of about 400° C. to about 800° C. while injecting air.

* * * * *